United States Patent
Smith et al.

(10) Patent No.: US 11,947,038 B2
(45) Date of Patent: Apr. 2, 2024

(54) WAVELENGTH ADAPTIVE NARROW BAND OPTICAL FILTER FOR A LIDAR SYSTEM

(71) Applicant: Continental Automotive Systems, Inc., Auburn Hills, MI (US)

(72) Inventors: Elliot Smith, Carpinteria, CA (US); Heiko Leppin, Hergensweiler (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1388 days.

(21) Appl. No.: 16/229,507

(22) Filed: Dec. 21, 2018

(65) Prior Publication Data
US 2020/0200875 A1    Jun. 25, 2020

(51) Int. Cl.
| | |
|---|---|
| G02B 5/20 | (2006.01) |
| G01S 7/481 | (2006.01) |
| G01S 7/486 | (2020.01) |
| G01S 17/931 | (2020.01) |
| G02B 5/28 | (2006.01) |

(52) U.S. Cl.
CPC ............ *G01S 7/4811* (2013.01); *G01S 7/486* (2013.01); *G01S 17/931* (2020.01); *G02B 5/208* (2013.01); *G02B 5/281* (2013.01); *G02F 2203/055* (2013.01)

(58) Field of Classification Search
CPC .... G02B 6/383; G02B 3/327; G02B 6/29395; G02B 2/29389; G02B 6/2937; G02B 5/20; G02B 5/28; G02B 5/281; G01S 7/4811; G01S 7/481; G01S 7/4812; G01S 7/486; G02F 223/055; G02F 2209/05; G02F 2203/055; G02F 2203/05
See application file for complete search history.

(56) References Cited

U.S. PATENT DOCUMENTS

| | | |
|---|---|---|
| 8,804,101 B2 | 8/2014 | Spagnolia et al. |
| 9,069,080 B2 | 6/2015 | Stettner et al. |

(Continued)

FOREIGN PATENT DOCUMENTS

| | | | | |
|---|---|---|---|---|
| CN | 108333689 A | * | 7/2018 | ........... G02B 6/2938 |
| WO | 2019048550 A1 | | 3/2019 | |

OTHER PUBLICATIONS

International Search Report and Written Opinion dated Mar. 18, 2020 for the counterpart PCT Application No. PCT/2019/068102.

*Primary Examiner* — Christopher Stanford
*Assistant Examiner* — Journey F Sumlar

(57) ABSTRACT

A LIDAR system includes a transmitter unit constructed and arranged to generate light and a photodetector structure for detecting received, reflected light. An actively tunable narrow band optical filter structure is located upstream of the photodetector structure to filter out wavelengths of light associated with sunlight prior to being received by the photodetector structure. The filter structure is constructed and arranged to change optical filtering thereof so as to change wavelengths of light permitted to pass there-through. A photodiode detects light passing through the filter structure. A control unit is associated with the photodiode and the filter structure and is constructed and arranged such that based on the light detected by the photodiode, the control unit can cause the filter structure to change the optical filtering thereof by heating or rotating the filter structure so as to compensate for drifting or broadening of a wavelength of the transmitter unit.

18 Claims, 9 Drawing Sheets

(56) References Cited

U.S. PATENT DOCUMENTS

| | | |
|---|---|---|
| 9,110,169 B2 | 8/2015 | Stettner et al. |
| 9,277,204 B2 | 3/2016 | Gilliland et al. |
| 9,420,246 B2 | 8/2016 | Na et al. |
| 9,420,264 B2 | 8/2016 | Gilliland et al. |
| 9,797,995 B2 | 10/2017 | Gilliland et al. |
| 9,834,209 B2 | 12/2017 | Stettner et al. |
| 9,915,726 B2 | 3/2018 | Bailey et al. |
| 9,933,514 B1* | 4/2018 | Gylys .................. G01S 7/4816 |
| 10,126,411 B2 | 11/2018 | Gilliland et al. |
| 10,241,196 B2 | 3/2019 | Bailey et al. |
| 10,295,670 B2 | 5/2019 | Stettner et al. |
| 10,557,926 B2 | 2/2020 | Gilliland et al. |
| 10,955,532 B2 | 3/2021 | Gilliland et al. |
| 2002/0190727 A1 | 12/2002 | Morimoto |
| 2003/0087121 A1* | 5/2003 | Domash ............. G02B 6/29395 |
| | | 428/641 |
| 2010/0101924 A1 | 4/2010 | Wu et al. |
| 2011/0222064 A1 | 9/2011 | Umeda et al. |
| 2014/0036252 A1* | 2/2014 | Amzajerdian ........ G01S 17/875 |
| | | 356/28 |
| 2014/0152813 A1 | 6/2014 | Wilks et al. |
| 2015/0185244 A1* | 7/2015 | Inoue ...................... G01S 17/36 |
| | | 356/28 |
| 2017/0184399 A1* | 6/2017 | Thayer ................. G01C 13/008 |
| 2017/0199273 A1 | 7/2017 | Morikawa et al. |
| 2017/0219426 A1 | 8/2017 | Pacala et al. |
| 2017/0289524 A1 | 10/2017 | Pacala et al. |
| 2018/0059222 A1 | 3/2018 | Pacala et al. |
| 2018/0167602 A1* | 6/2018 | Pacala .................... G02B 5/208 |
| 2018/0172809 A1* | 6/2018 | Efimov .................. G01S 17/95 |
| 2019/0033429 A1* | 1/2019 | Donovan ............... G01S 17/06 |
| 2019/0107484 A1* | 4/2019 | Thrush ............... G01N 21/3577 |
| 2019/0293794 A1* | 9/2019 | Zhang .................. G01S 7/4817 |

* cited by examiner

WAVELENGTH ADAPTIVE NARROW BAND OPTICAL FILTER FOR A LIDAR SYSTEM

FIELD

This invention relates to advanced driver assist systems or autonomous driving vehicles using LIDAR and, more particularly, to a LIDAR system having a narrow band optical filter structure that can be actively tuned to a desired wavelength to block out a significant portion of background radiation and that can compensate for drifting or broadening of a wavelength of the transmitter unit.

BACKGROUND

When operating LIDAR systems in the NIR (Near-Infrared) or close to visible region of the spectrum, it becomes increasingly important to block out background radiation, most specifically, sunlight. The better sunlight is blocked, the higher the signal to noise ratio (SNR) of the LIDAR system improves.

One way to block out the sunlight is by creating a narrow band optical filter in front of the receiving optics. However, doing so doesn't account for unwanted drifting or broadening of the transmitter wavelength. A drift or broadening of the transmitter wavelength would result in an undesired reduction of the SNR of the system.

Thus, there is a need to provide a narrow band optical filter structure for a LIDAR system that can be actively tuned to a desired wavelength to block out sunlight and that can compensate for drifting or broadening of a wavelength of the transmitter unit.

SUMMARY

An object of the invention is to fulfill the need referred to above. In accordance with the principles of the present invention, this objective is achieved by a LIDAR system includes a transmitting portion having a transmitter unit constructed and arranged to generate light, and transmitter lens structure for projecting the light so as to illuminate an area in front of the system. A receiving portion of the system includes a receiver lens structure for receiving light reflected from an object in the area in front of the system, and a photodetector or photodetector array for detecting the received light. An actively tunable narrow band optical filter structure is located upstream of the photodetector array and is constructed and arranged to filter out wavelengths of light associated with background radiation, e.g. sunlight, prior to being received by the photodetector array. The filter structure is constructed and arranged to change optical filtering thereof so as to change wavelengths of light permitted to pass there-through. A photodiode constructed and arranged to detect light passing through the filter structure. A control unit is associated with the photodiode and the filter structure and is constructed and arranged such that based on the light detected by the photodiode, the control unit can cause the filter structure to change the optical filtering thereof so as to compensate for drifting or broadening of a wavelength of the transmitter unit.

In accordance with another aspect of an embodiment, a method in a LIDAR system compensates for transmitter unit drift while filtering out wavelengths of light associated with background radiation, e.g. sunlight. The LIDAR system includes a transmitting portion including the transmitter unit constructed and arranged to generate light, and transmitter lens structure for receiving the light so as to illuminate an area in front of the system. A receiving portion of the system includes a receiver lens structure for receiving light reflected from an object in the area in front of the system, and a photodetector or photodetector array for detecting the received light. The method provides an actively tunable narrow band optical filter structure upstream of the photodetector array. The filter structure is constructed and arranged to filter out wavelengths of light not associated with the transmitted wavelength of the system, e.g. sunlight, prior to being received by the photodetector or photodetector array. Light passing through the filter structure is detected. Based on the detected light, optical filtering of the filter structure is changed to change the wavelengths of light permitted to pass through the filter structure so as to compensate for drifting or broadening of the wavelength of the transmitter unit.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
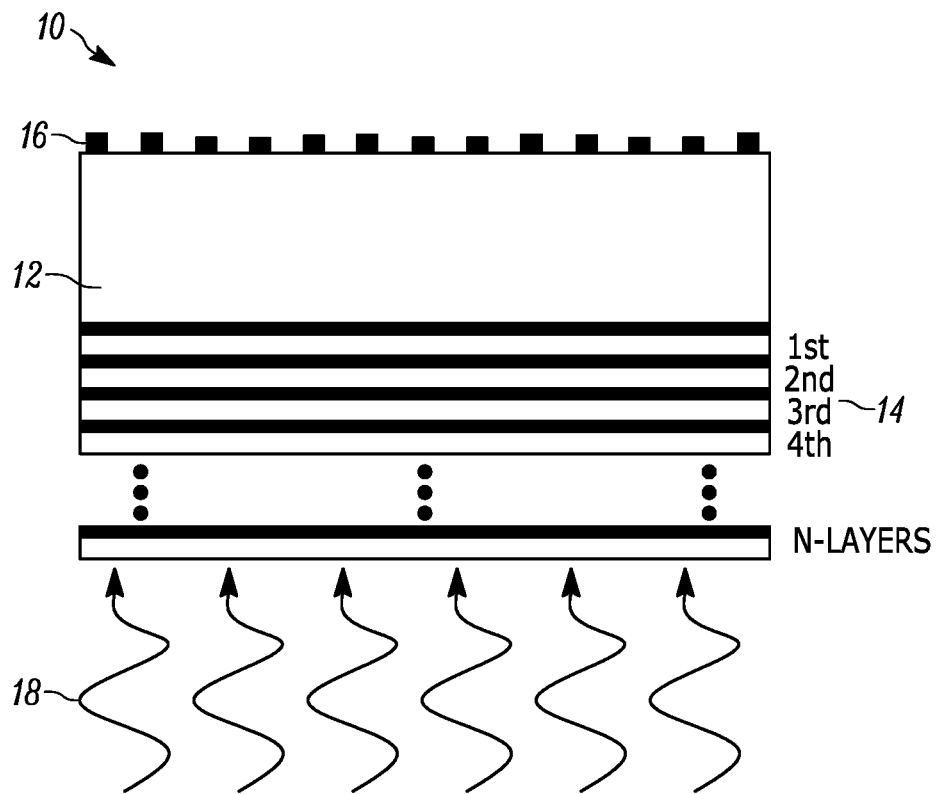
FIG. 1 is a side view of an actively tunable narrow band optical filter structure in accordance with an embodiment.
Figure 2:
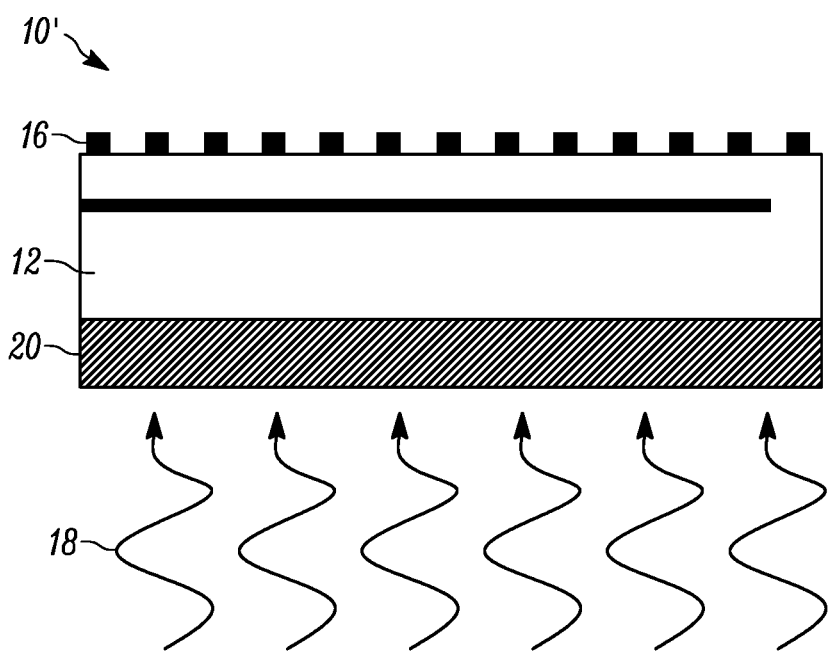
FIG. 2 is a side view of an actively tunable narrow band optical filter structure in accordance with another embodiment.
Figure 3:
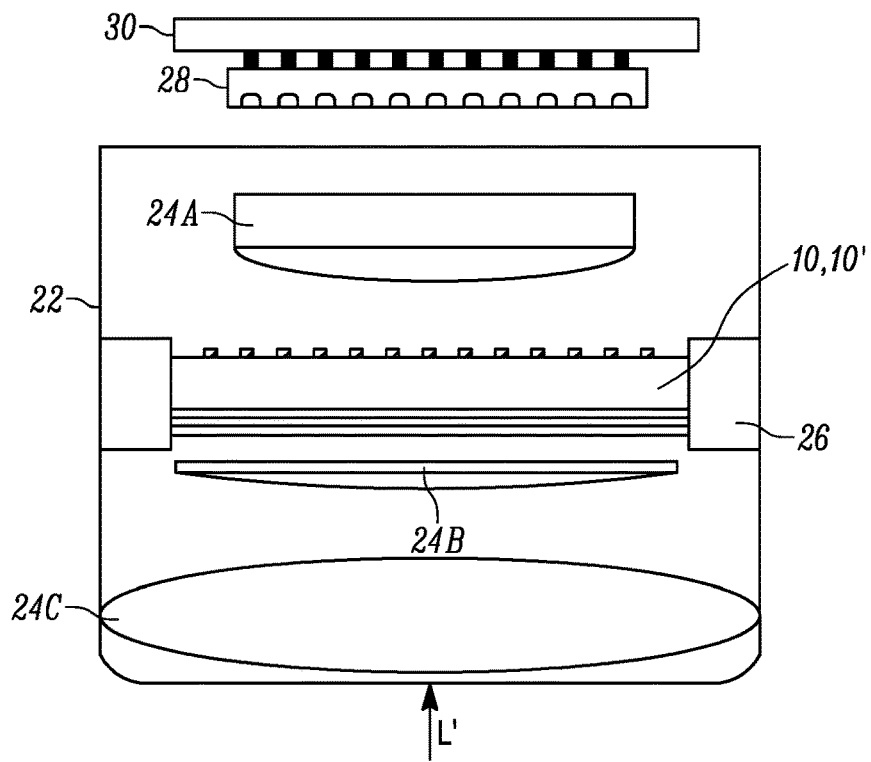
FIG. 3 shows placement of the narrow band optical filter structure of an embodiment within a receiving optics housing of a LIDAR system.
Figure 4:
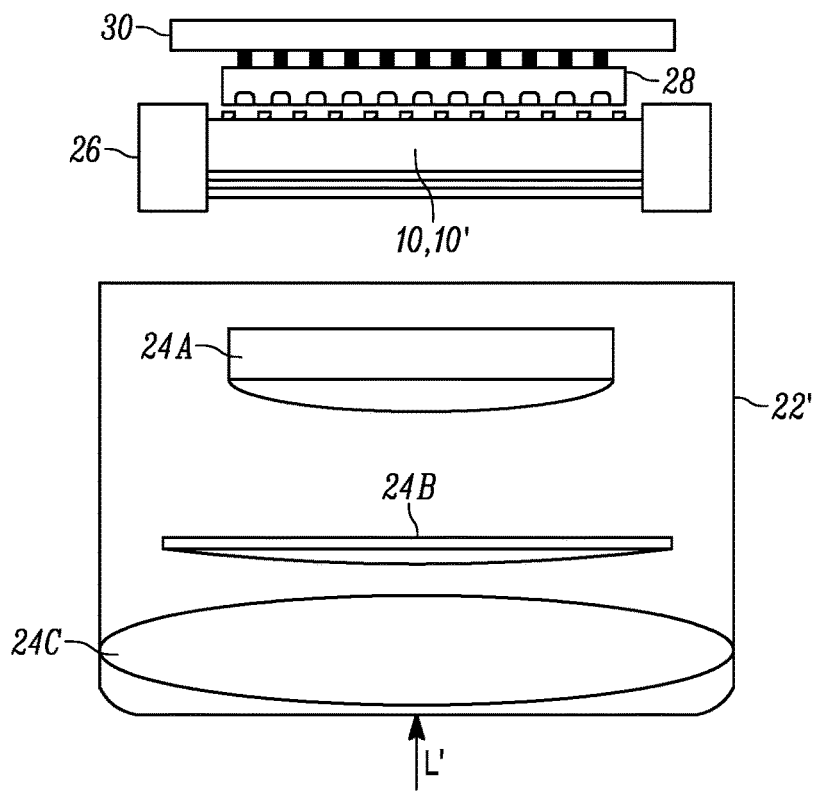
FIG. 4 shows placement of a narrow band optical filter structure of an embodiment within the near field of a photodetector array of a LIDAR system.

With reference to FIG. 1, an actively tunable narrow band optical filter structure is shown, generally indicated at 10, in accordance with an embodiment. The filter structure 10 includes an NIR-transparent substrate 12. A Bragg grating 14, defining a narrow band optical filter (preferably to block out background radiation, e.g., sunlight), is provided on one side of the substrate 12 and heating structure 16, preferably in the form or a network of resistive units for heating, is provided on the opposing side of the substrate 12. Incoming light is shown at 18. Instead of providing the Bragg grating as the optical filter, with reference to FIG. 2, another embodiment of the filter structure 10' includes an anti-reflective coating 20 as the filter on the end opposing the resistive units 16. With reference to FIG. 3, the filter structure 10 or 10' can be placed in a receiving optics housing 22 of a LIDAR system. Thus, for example, the filter structure 10 can be placed between lens element 24A, and a pair of lens elements 24B and 2C. The lens elements 24A, 24B and 24C define receiver lens structure that receives light L' that is reflected from an object in front of the lens structure. Thermal insulation 26 can be provided between the filter structure 10 and the housing 22. Photodetector structure such as a photodetector or preferably a photodetector array 28 detects light that is passed through the lenses 24 and filter structure 10. A readout integrated circuit (IC) 30 is provided, the function of which will be explained below. Alternatively, with reference to FIG. 4, the filter structure 10 or 10' can be placed outside of the housing 22' but within the near field of the photodetector array 28 of a LIDAR system. Thus, the filter structure is located upstream of the photodetector array 28. The photodetector array 28 can be a 1D or 2D array. The array 28 can comprise PiN diodes, Avalanche Photo Diodes (APDs), Single Photon Avalanche Diodes (APDs running in Geiger mode) (i.e. SPADs) or Silicon Photo multipliers (SiPMs). The array 28 can be either front-side or back-side illuminated.

Figure 5:
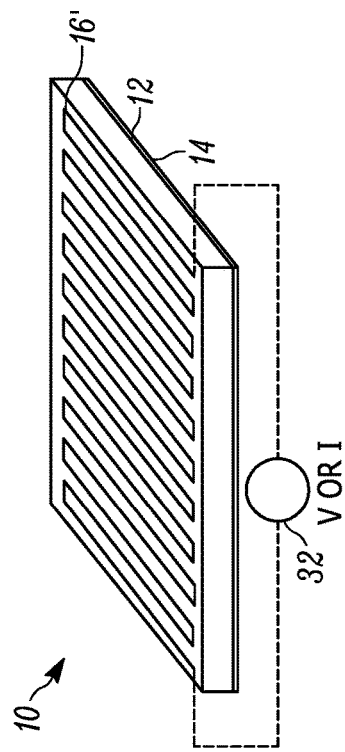
FIG. 5 shows a perspective view of heating structure mounted on a substrate of a narrow band optical filter structure of the embodiment.

FIG. 5 shows a perspective view of a heating structure 16' mounted on the substrate 12 of the filter structure 10 opposite the filter 14. The bandpass wavelength of the narrow band optical filter structure 10 can be adaptively shifted by controlling the thermal behavior of the filter structure 10. This can be performed by using the network of resistive units 16 (FIG. 1) or by a single resistive patterned element 16' on the filter structure 10. This resistive element 16 can be controlled by passing a voltage or current source 32 through it. The NIR-transparent substrate 12 can be any of the following: BK7, Sapphire, Quartz, Boresilicate, IR Fused Silica, UV Fused Silica, Zinc Selenide, Zinc Sulfide, Calcium Fluoride, Magnesium Fluoride, Sodium Chloride, Potassium Bromide, Schott IG2, Schott IG6, Thallium Bormoiodide, Sodium Chloride, Potassium Chloride, Barium Fluoride, Lithium Fluoride, AM TIR-1, Cesium Bromide, Silver Bromide, or any other suitable substrate material.

Figure 6:
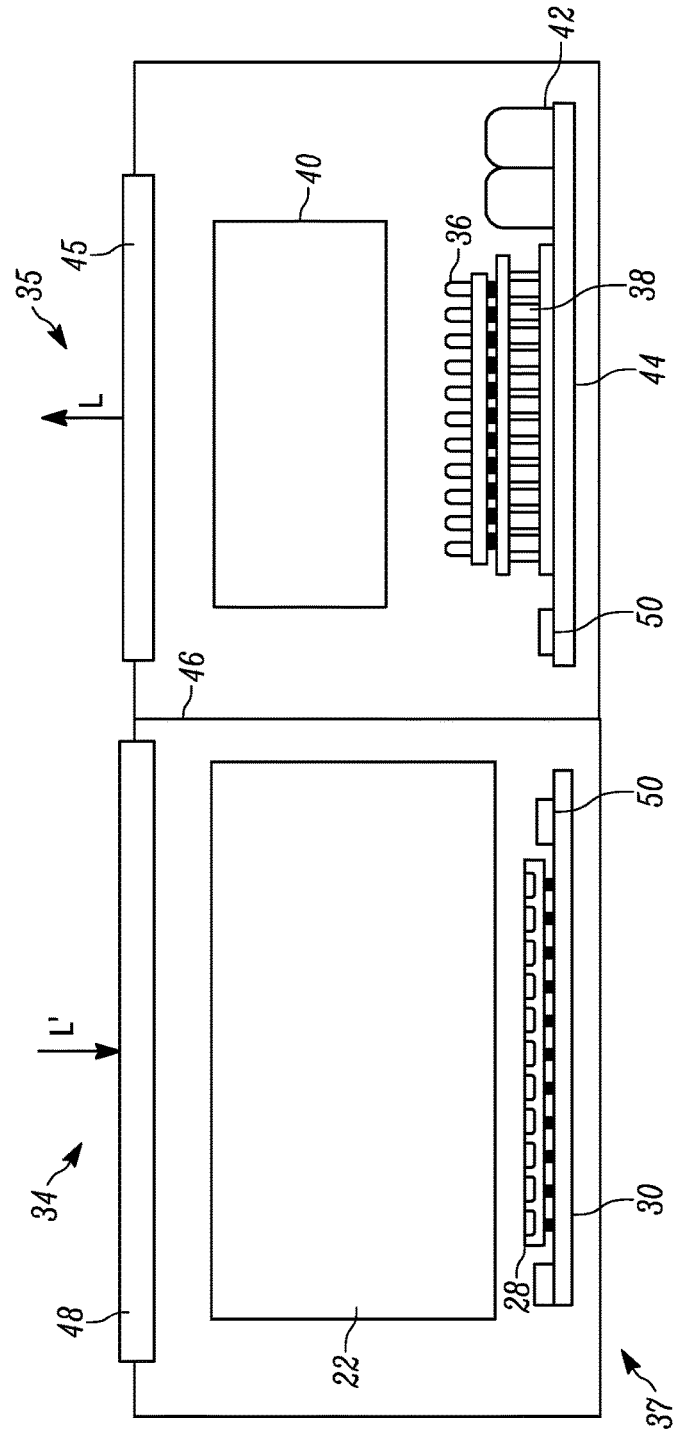
FIG. 6 is a schematic view of filter structure of an embodiment employed in a VCSEL LIDAR system.

The filter structure 10 is employed in a LIDAR system shown generally indicated at 34 in FIG. 6. The LIDAR system 34 includes transmitter portion 35 including a transmitter unit 36 preferably in the form of a Vertical Cavity Surface-Emitting Laser (VCSEL) to transmit light L, thermal management components 38, transmitting lens structure 40 for projecting the light so as to illuminate an area in front of the system 34, passive energy storage components 42, a transmitter driver board 44 and transmitter glass 45. A receiving portion 37 of the system 34 is separated from the transmitting portion 35 by an optical barrier 46. The receiving portion 37 includes, for example, the housing 22 containing the receiver lens structure 24 and the filter structure 10 as shown in FIG. 3, the photodiode array 28, readout IC 30, and receiver glass 48. Passive components are indicated at 50.

Figure 7:
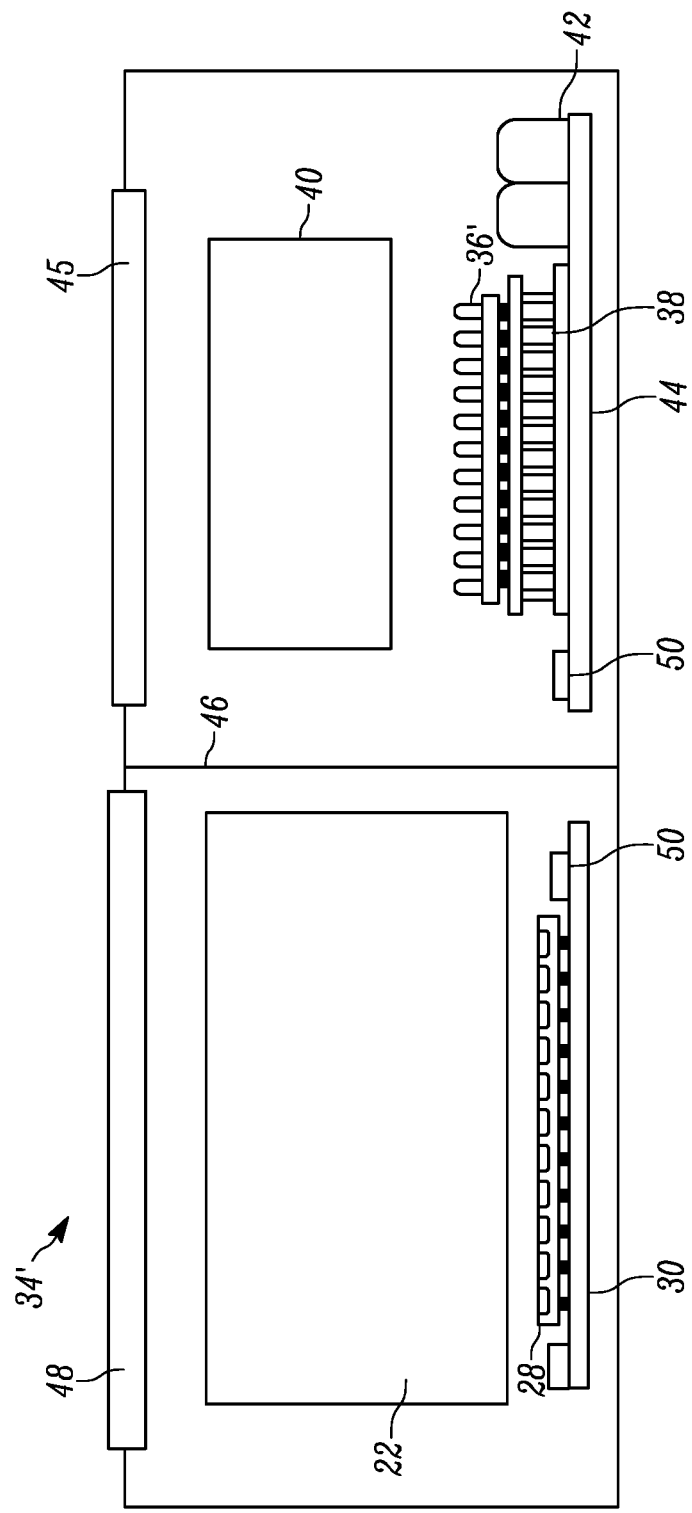
FIG. 7 is a schematic view of filter structure of an embodiment employed in an Edge Emitting Laser LIDAR system.
Figure 8:
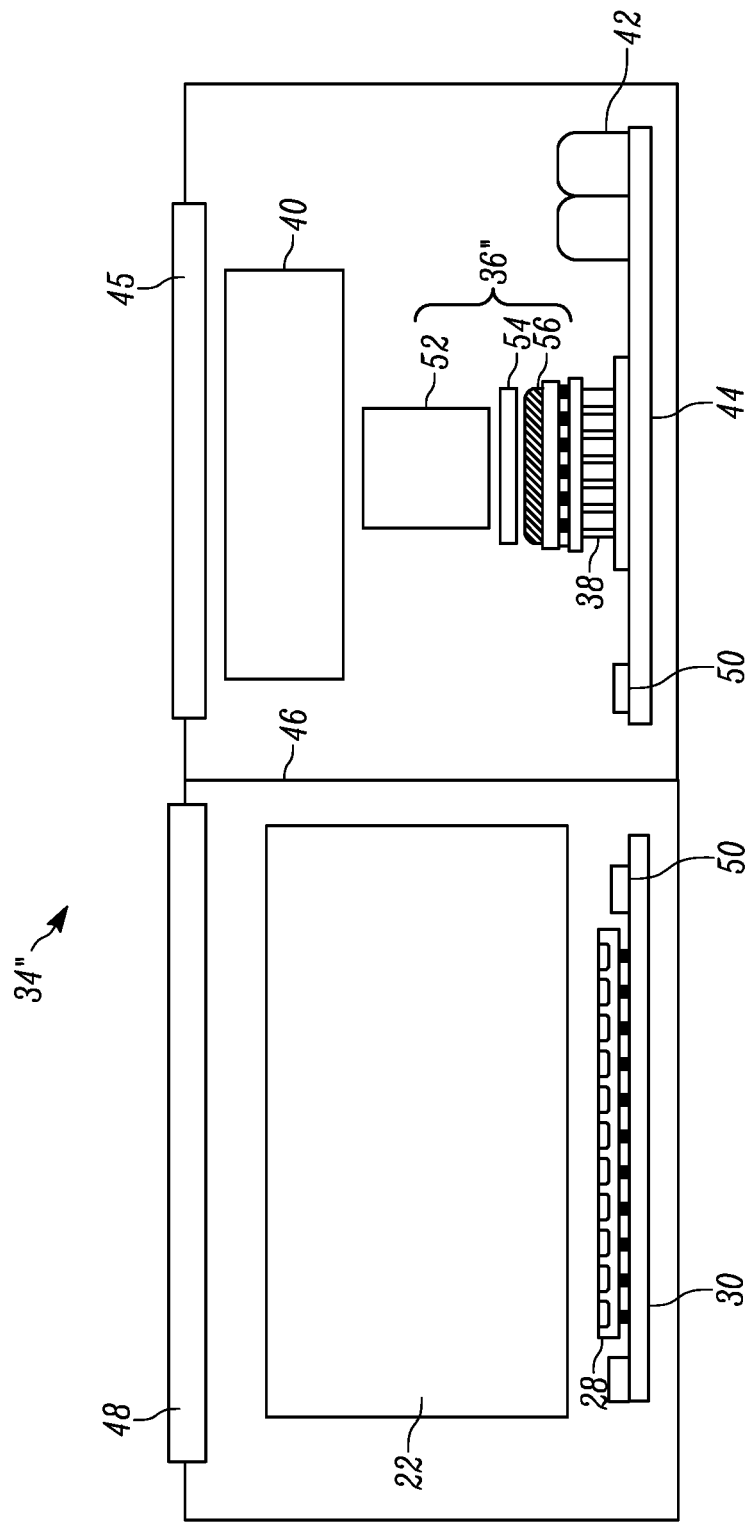
FIG. 8 is a schematic view of filter structure of an embodiment employed in a DPSSL LIDAR system.

FIG. 7 shows another embodiment of a LIDAR system 34' including the housing 22 containing the filter structure 10 (not shown). In this embodiment, the transmitter unit 36' is an edge emitting laser diode. FIG. 8 shows yet another embodiment of a LIDAR system 34" including the housing 22 containing the filter structure 10 (not shown). In this embodiment, the transmitter unit 36" is a Diode-Pumped Solid State Laser (DPSSL) having a laser crystal 52, an active or passive Q-switch (not shown), pump delivery optics 54, and a diode pump 56 including an edge emitting diode or VCSEL.

Figure 9:
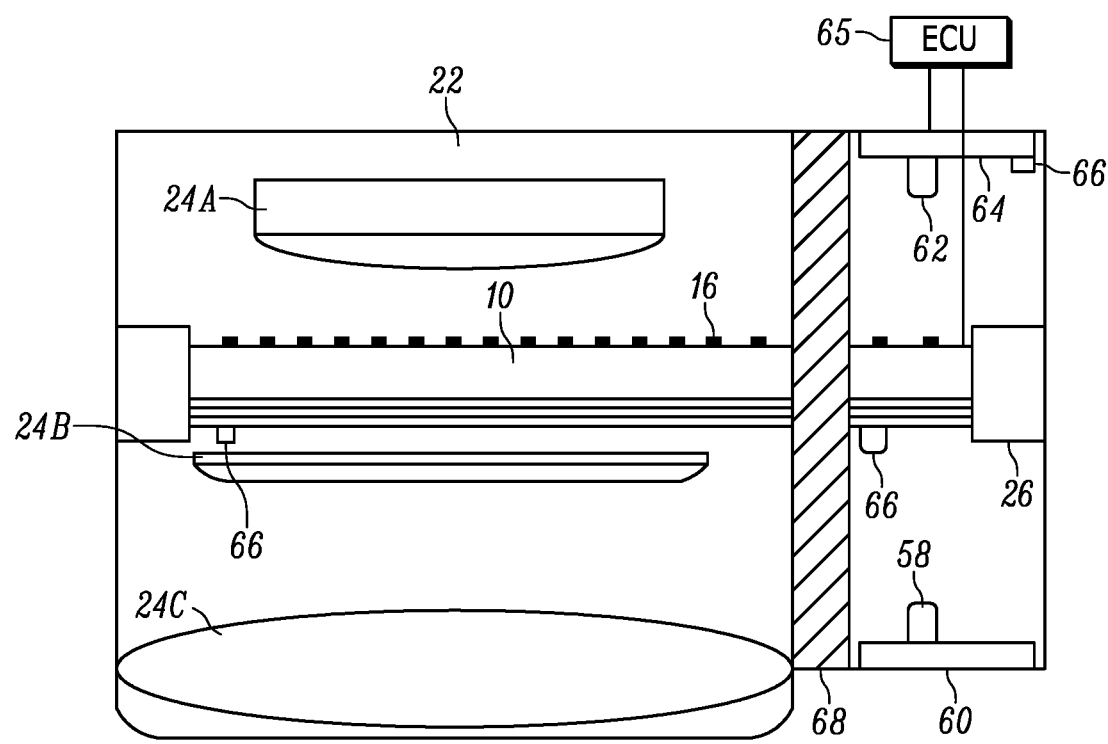
FIG. 9 is a schematic view of filter structure and an additional light source defining an optical feedback system of an embodiment.

In accordance with an embodiment, an optical feedback system can be used to optimize the transmission intensity of a particular wavelength. With reference to FIG. 9, this can be done with a separate or dedicated light source 58 mounted on a printed circuit board (PCB) 60. A photodiode 62, mounted on an PCB 64, receives the light from light source 58 so as to actively monitor the output wavelength from the filter structure 10, allowing for the thermal adjustment of the filter structure 10 via the heating element 16 to maximize transmission. The electrical output of the photodiode is connected with an electronic control unit (ECU) 65 which controls the current or voltage 32 to the heating element 16. Thermistors 66 are provided to monitor temperature and an optical barrier 68 is provided so that light from source 58 does not enter lens 24A.

Figure 10:
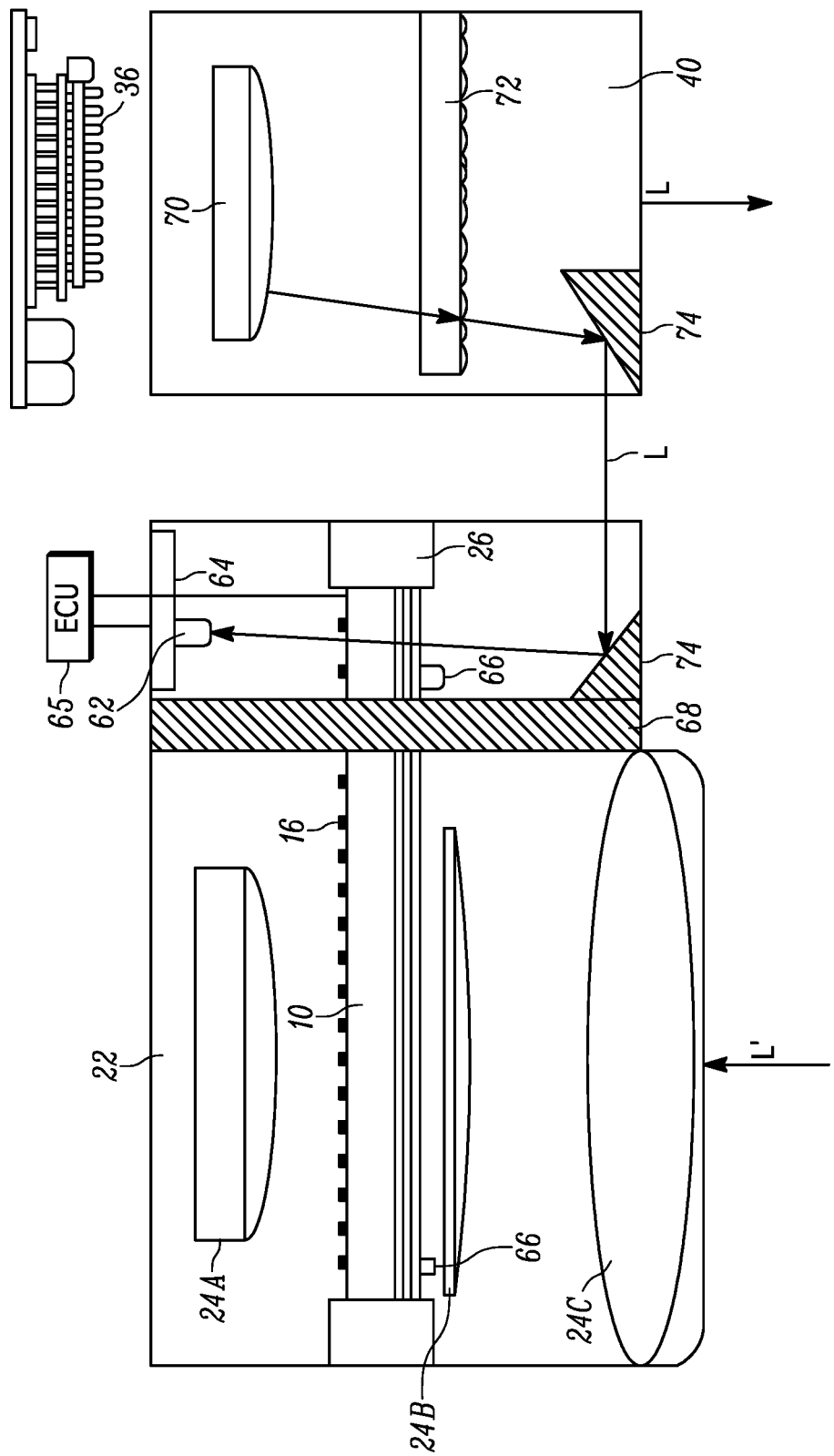
FIG. 10 is a schematic view of filter structure receiving light from a transmitter unit to define an optical feedback system of an embodiment.

With reference to FIG. 10, instead of providing the separate light source 58, light can be directly taken from the transmitter unit 36. Light from the transmitter unit 36 passes through lens 70 and diffuser 72 and is directed by reflectors 74 to be received by the photodiode 62 so as to actively monitor the output wavelength from the filter structure 10, allowing for the thermal adjustment of the filter structure 10 via the heating element 16 to maximize transmission as noted above. The trigger point for deciding to adjust the filter structure 10 could be based on the ambient temperature, or laser temperature. This could be based on a pre-calibrated known transmission profile for the particular filter structure 10 and/or laser source.

Figure 11A:
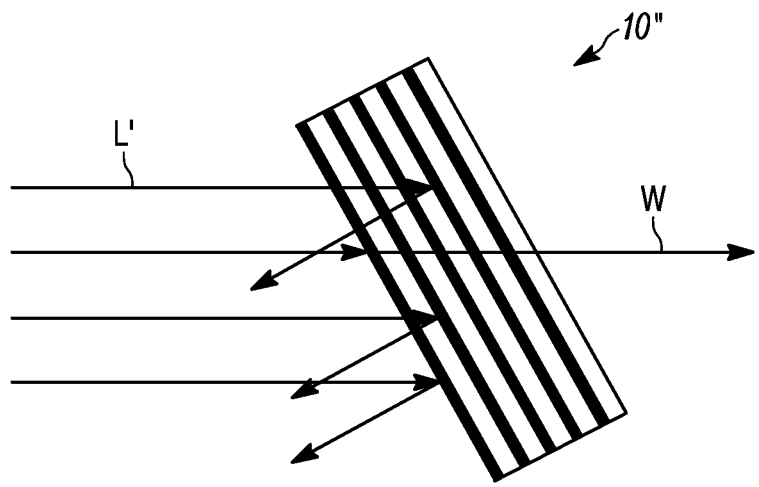
FIG. 11A shows another embodiment of a filter structure having a passing wavelength W.
Figure 11B:
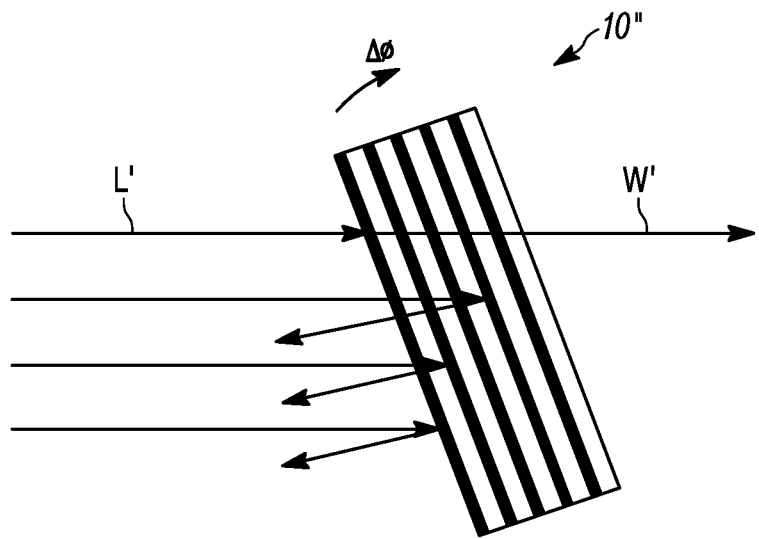
FIG. 11B shows the filter structure of FIG. 11A rotated resulting in a different passing wavelength W'.

With reference to FIG. 11A, another embodiment of the narrow band optical filter structure is shown generally indicated at 10", in the form of a Fabry-Perot-Bragg filter, which is a combination of an Etalon and a Bragg filter. It is possible to make Fabry-Perot-Bragg filters continuously tunable by tilting the filter structure 10" a few degrees to shift the passing wavelength W by one free spectral range. For example, FIG. 11A shows the passing light wavelength W through the filter structure 10". However, with reference to FIG. 11B, upon rotating the filter structure 10" as indicated by Δθ, a different wavelength W' passes through the filter structure 10".

Figure 13:
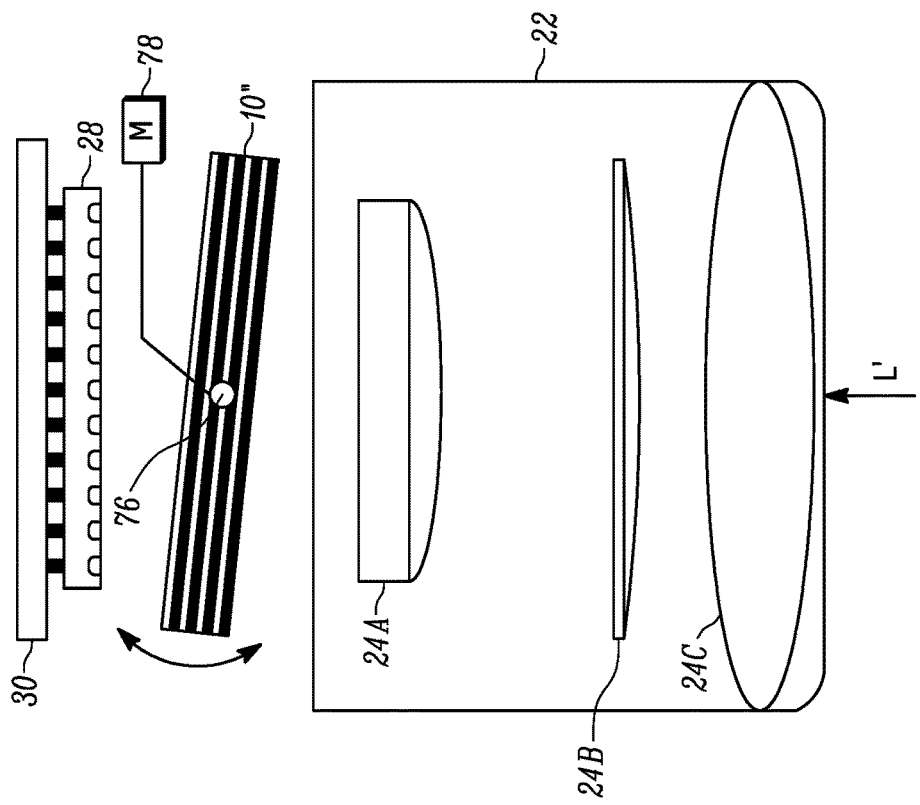
FIG. 13 shows placement of another embodiment of the narrow band optical filter structure within the near field of a photodetector array of a LIDAR system.
Figure 12:
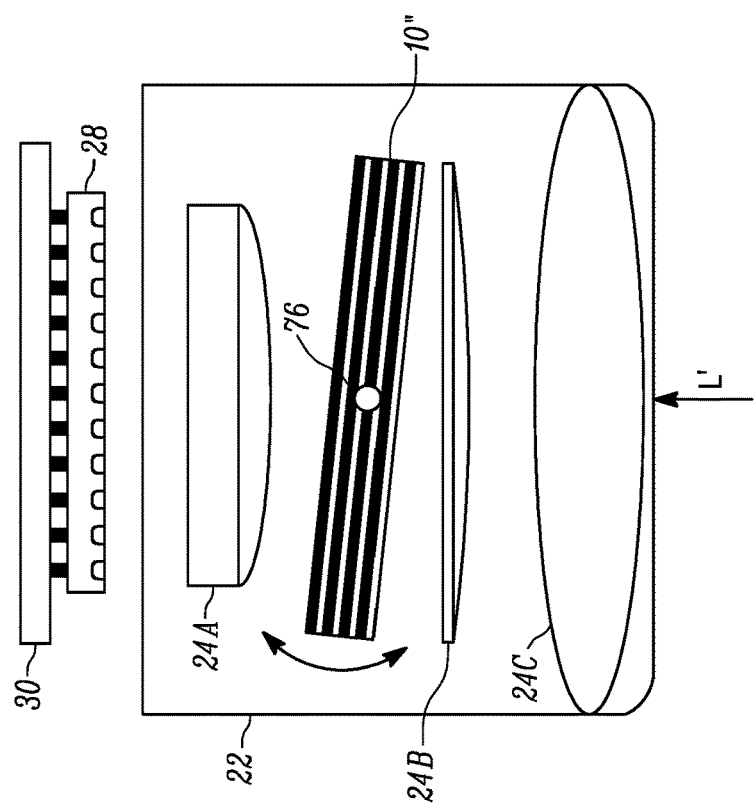
FIG. 12 shows placement of another embodiment of the narrow band optical filter structure within a receiving optics housing of a LIDAR system.

With reference to FIG. 12, the filter structure 10" can be placed within the receiving optics housing 22 or, as shown in FIG. 13, can be placed within the near field of the photodetector array 28 or adjacent thereto, but outside of the housing 22. The filter structure 10" can be mounted on a rotatable shaft 76, preferably actuated by a motor 78 (FIG. 13).

Similar to FIGS. 9 and 10, the filter structure 10" can be employed in a LIDAR system having the feedback loop employing the light source 58 (or light from transmitter unit 36) and the photodiode 62 so that the photodiode 62 receives the light from the light source to actively monitor the output wavelength from the filter structure 10". Thus, based on light detected by the photodiode 62, rotational adjustment of the filter structure 10" via the shaft 76 and motor 78 can maximize the filter structure 10" for the strongest wavelength emitted by the transmitter unit 36. The electrical output of the photodiode is connected with an electronic control unit (ECU) 65 (FIG. 9) which controls the motor 78 to rotate the shaft 76.

The LIDAR system 34 with tunable filter structure 10, 10' can be employed in a vehicle. The system 34 is typically on the exterior of the vehicle, for example on the front bumper, or the side of the vehicle such as between the doors, or on the rear of the vehicle or any other place in or out of the vehicle so as to illuminate an area outside of the vehicle with laser light L and detect the reflection of the laser light L' from objects disposed in the lighted area.

With the disclosed LIDAR system, the filter structure 10, 10', 10" blocks out certain wavelengths of light associated with background radiation sources, e.g., sunlight, prior to being received by the photodetector array 28, and a feedback loop is employed to actively tune the narrow band optical filter structure 10, 10', 10" by changing optical filtering thereof (e.g., by heating or by rotating) to compensate for drifting or broadening of the transmitter wavelength in different ambient temperatures. Also, with the use of the Thermal Electric Cooler (TEC) under the laser source, the emitter can be further tuned. Both of these tunings combined can lead for a much improved transmission and reception of photons over the entire automotive grade thermal requirements.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A LIDAR system comprising:
 a transmitting portion comprising a transmitter unit constructed and arranged to generate light, and transmitter lens structure for projecting the light so as to illuminate an area in front of the system,
 a receiving portion comprising receiver lens structure for receiving light reflected from an object in the area in front of the system, and a photodetector structure for detecting the received light,
 an actively tunable narrow band optical filter structure located upstream of the photodetector structure and constructed and arranged to filter out wavelengths of light associated with background radiation prior to being received by the photodetector structure, the filter structure being constructed and arranged to change optical filtering thereof so as to change wavelengths of light permitted to pass there-through,
 a photodiode constructed and arranged to detect light passing through the filter structure, and
 a control unit associated with the photodiode and the filter structure and constructed and arranged such that based on the light detected by the photodiode, the control unit can cause the filter structure to change the optical filtering thereof so as to compensate for drifting or broadening of a wavelength of the transmitter unit;
 wherein the filter structure comprises a transparent substrate, heating structure on one side of the substrate, and a filter on a side of the substrate opposing the one side thereof, and wherein the control unit is constructed and arranged to send a voltage or a current to the heating structure to cause heating of the filter structure, thereby changing the optical filtering of the filter structure.

2. The system of claim 1, wherein the filter is a Bragg grating.

3. The system of claim 1, wherein the filter is an anti-reflective coating.

4. The system of claim 1, wherein the heating structure comprises a network of resistive units.

5. The system of claim 1, wherein the heating structure comprises a single resistive patterned element.

6. The system of claim 1, further comprising a dedicated light source only for the photodiode.

7. The system of claim 1, wherein the transmitter unit is constructed and arranged to define a light source for the photodiode.

8. The system of claim 1, wherein the lens structure comprises a plurality of lenses disposed in a housing, the filter structure being disposed in the housing.

9. The system of claim 1, wherein the lens structure comprises a plurality of lenses disposed in a housing, the filter structure being disposed adjacent to the photodetector structure and outside of the housing.

10. The system of claim 1, wherein the filter structure comprises Fabry-Perot-Bragg filter, wherein the filter structure is mounted on a rotatable shaft, the system further comprising a motor for rotating the shaft, and wherein the control unit is constructed and arranged to control the motor to cause rotation of the shaft and thus the filter structure, thereby changing the optical filtering of the filter structure.

11. The system of claim 10, wherein the lens structure comprises a plurality of lenses disposed in a housing, the filter structure being disposed in the housing.

12. The system of claim 10, wherein the lens structure comprises a plurality of lenses disposed in a housing, the filter structure being disposed adjacent to the photodetector structure and outside of the housing.

13. A method in a LIDAR system that compensates for transmitter unit drift while filtering out wavelengths of light associated with sunlight, the LIDAR system comprising a transmitting portion including the transmitter unit constructed and arranged to generate light, and transmitter lens structure for projecting the light so as to illuminate an area in front of the system; and a receiving portion including receiver lens structure for receiving light reflected from an object in an area in front of the system, and photodetector structure for detecting the received light, the method comprising the steps of:
 providing an actively tunable narrow band optical filter structure upstream of the photodetector structure, the filter structure being constructed and arranged to filter out wavelengths of light not associated with a transmitted wavelength of the system, prior to being received by the photodetector structure,
 detecting light passing through the filter structure,
 based on the detected light, changing optical filtering of the filter structure to change the wavelengths of light permitted to pass through the filter structure so as to compensate for drifting or broadening of a wavelength of the transmitter unit, wherein the step of changing optical filtering of the filter structure includes heating and rotating the filter structure.

14. The method of claim 13, wherein the heating includes sending a current or a voltage to heating structure mounted on the filter structure.

15. The method of claim 13, wherein the step of detecting light passing through the filter structure includes detecting the light with a photodiode.

16. The method of claim 15, wherein the detected light is from a light source dedicated to only the photodiode.

17. The method of claim 15, wherein the detected light is from light generated by the transmitter unit.

18. A LIDAR system comprising:
- a transmitting portion comprising a transmitter unit constructed and arranged to generate light, and transmitter lens structure for projecting the light so as to illuminate an area in front of the system,
- a receiving portion comprising receiver lens structure for receiving light reflected from an object in the area in front of the system, and a photodetector structure for detecting the received light,
- an actively tunable narrow band optical filter structure located upstream of the photodetector structure and constructed and arranged to filter out wavelengths of light associated with background radiation prior to being received by the photodetector structure, the filter structure being constructed and arranged to change optical filtering thereof so as to change wavelengths of light permitted to pass there-through,
- a photodiode constructed and arranged to detect light passing through the filter structure, and
- a control unit associated with the photodiode and the filter structure and constructed and arranged such that based on the light detected by the photodiode, the control unit can cause the filter structure to change the optical filtering thereof so as to compensate for drifting or broadening of a wavelength of the transmitter unit,
wherein the filter structure comprises Fabry-Perot-Bragg filter mounted on a rotatable shaft, the system further comprising a motor for rotating the shaft, and wherein the control unit is constructed and arranged to control the motor to cause rotation of the shaft and thus the filter structure, thereby changing the optical filtering of the filter structure.

* * * * *